Figure 3:
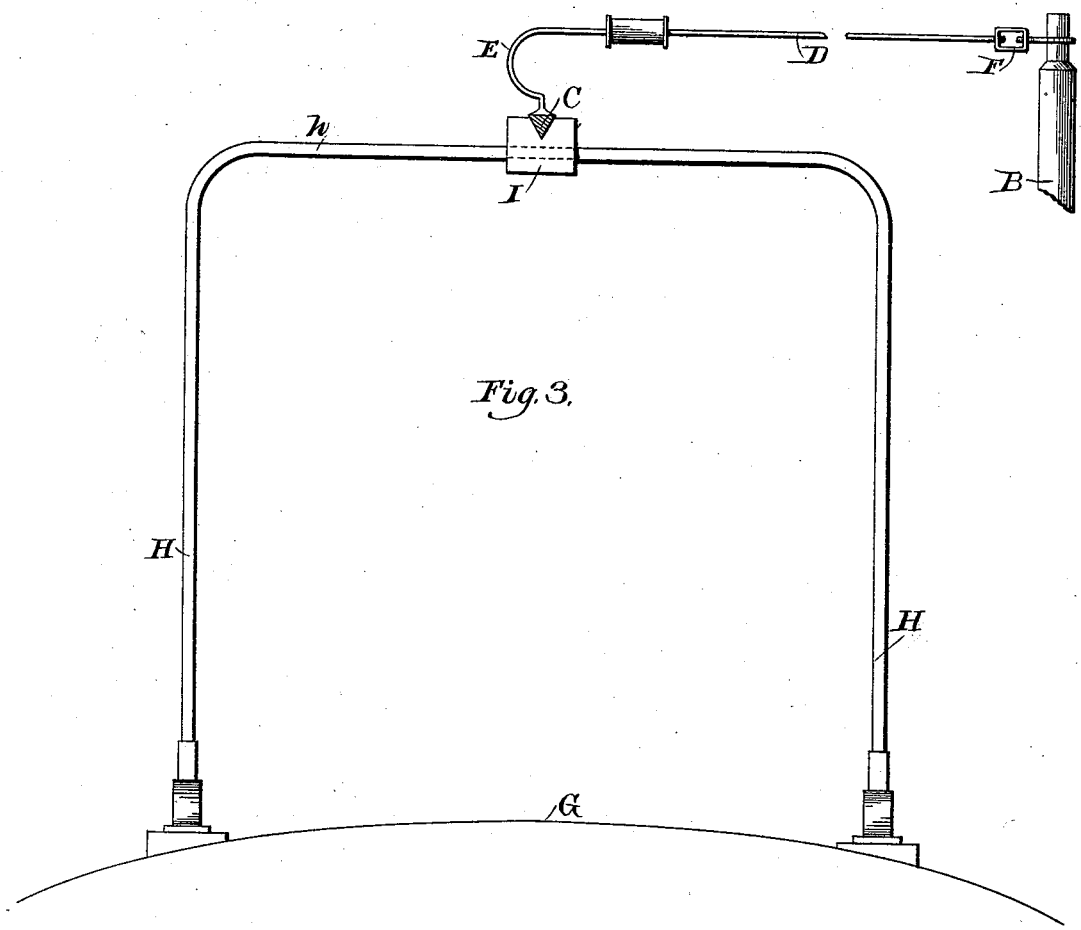

(No Model.)
2 Sheets—Sheet 1.
J. C. HENRY.
ELECTRIC RAILWAY.
No. 508,615.
Patented Nov. 14, 1893.
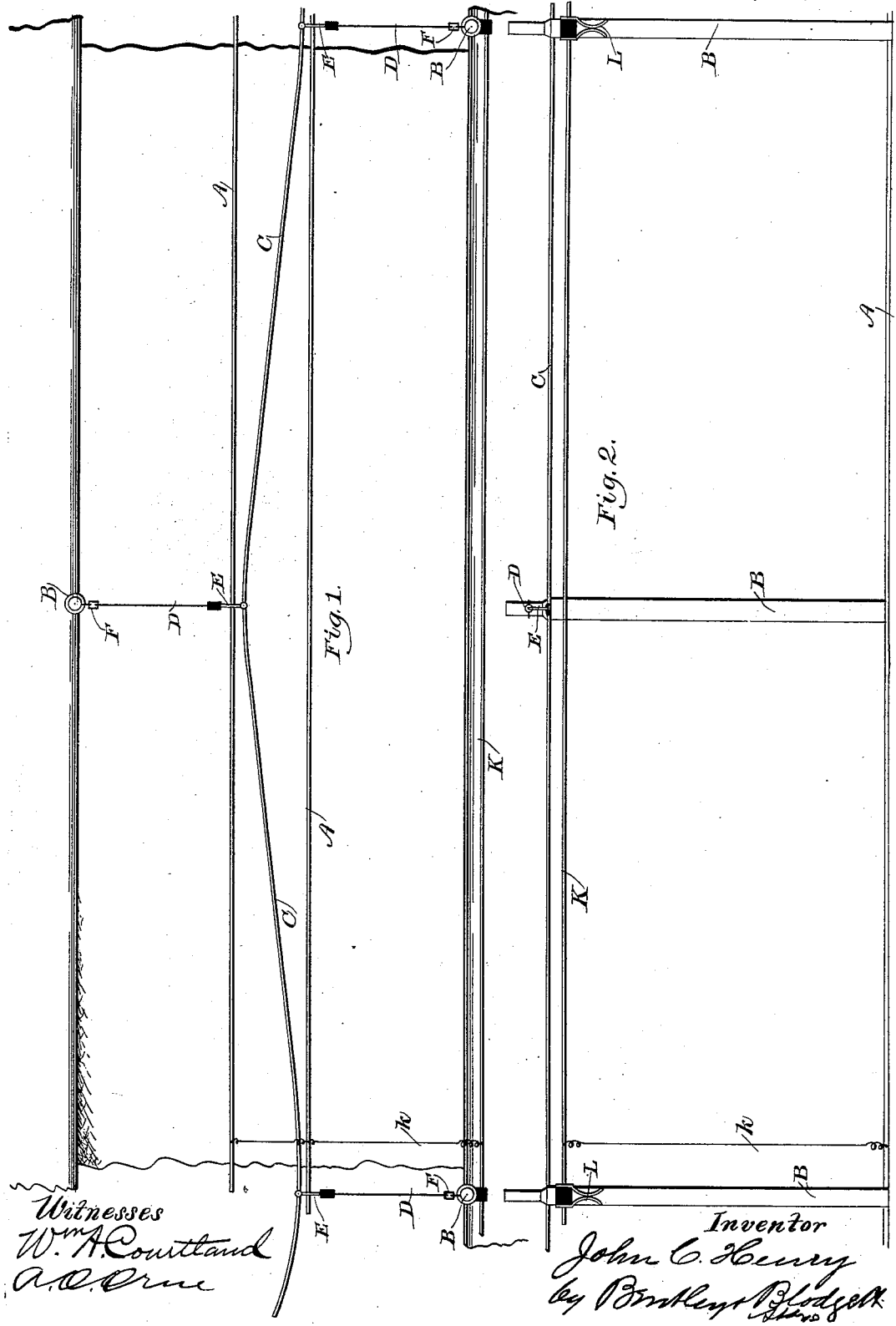

(No Model.) 2 Sheets—Sheet 2.

J. C. HENRY.
ELECTRIC RAILWAY.

No. 508,615. Patented Nov. 14, 1893.

Witnesses
Wm H Courtland
A O Orne

Inventor
John C. Henry
by
Bentley & Blodgett
Attys.

UNITED STATES PATENT OFFICE.

JOHN C. HENRY, OF WESTFIELD, NEW JERSEY.

ELECTRIC RAILWAY.

SPECIFICATION forming part of Letters Patent No. 508,615, dated November 14, 1893.

Application filed September 10, 1892. Serial No. 445,511. (No model.)

*To all whom it may concern:*

Be it known that I, JOHN C. HENRY, a citizen of the United States, residing at Westfield, county of Union, State of New Jersey, have invented certain new and useful Improvements in Electric Railways, of which the following is a specification.

My invention relates to electric railways and its object is to improve the overhead line structure, and the traveling contact, and to provide means whereby the rail connections may be supplemented by an additional conductor or conductors.

My improved overhead structure consists in a series of staggered poles set alternately on opposite sides of the roadway, and a single working conductor carried by guy wires running out from each of said poles to said conductor. This gives the conductor a slightly zigzag direction, and my improved contact device is adapted to slide laterally on a yielding frame or support, so as to follow the sinuosities of the line. Where the track rails are included in the circuit, it is necessary to maintain a good connection between them. This is usually done by means of a conductor buried in the earth and connected at intervals with the rails. The joints too, are bridged by short lengths of metal soldered or otherwise electrically connected with the ends of the rails. It is also desirable to establish an independent or additional return circuit which is not subject to the disadvantages of leakage, defective joints, accidents to the track and the like. I use therefore a supplemental grounded return conductor of comparatively high resistance, supported in an exposed position adjacent to the track, with which it is connected at intervals. In case of a fault in the usual track circuit, the circuit is shunted around the bad spot through the supplemental conductor.

In the drawings, Figure 1 is a plan of a portion of an electric road embodying my invention. Fig. 2 is a side elevation. Fig. 3 is an elevation of the trolley, showing the working conductor in section.

The track rails A are shown as occupying the middle of the roadway, on either side of which are set the poles B, in a staggered arrangement. The working conductor C is supported by guy wires D running out from each pole to the conductor, so that the latter assumes a zigzag shape in a horizontal plane, as shown in Fig. 1. The conductor is preferably triangular in cross section, and is arranged with one side horizontal and uppermost. An insulated hanger E is fastened to the conductor and to the guy wire D, which can be tightened by a turn buckle F.

In Fig. 3 the line G represents the roof of a car, on which is mounted a trolley; preferably comprising a rocking spring frame H, having at its top a horizontal transverse bar $h$ on which is mounted the contact I. This may consist of a block having a groove to fit the wire C; or it may be a grooved wheel. In either case it is free to slide laterally on the bar $h$, so as to follow the sinuosities of the conductor. Running along one side of the roadway is a supplemental return wire K, supported on the poles B, and connected at intervals by branch wires $k$ with the rails of the track. The wire serves to shunt the return current around any faulty portion of the track circuit.

What I claim as new, and desire to secure by Letters Patent, is—

1. In an electric railway, a series of poles arranged alternately on opposite sides of the roadway, a working conductor, and short guy wires running out from each pole to said conductor, substantially as described.

2. In an electric railway, a working conductor arranged in a zigzag or sinuous line in a horizontal plane, and a car provided with a laterally movable trolley, substantially as set forth.

3. In an electric railway, a working conductor triangular in cross section, insulated hangers attached to the upper horizontal side of said conductor, and adjustable guy wires supporting said hangers, substantially as described.

4. In an electric railway provided with the usual buried return conductor connected with the track, a supplemental grounded conductor supported in an exposed position adjacent to the road, and electrically connected with the track at intervals, substantially as described.

5. In an electric railway, in which the track forms the grounded return conductor, a supplemental return conductor of comparatively high resistance connected at intervals with the track, substantially as described.

In witness whereof I have hereto set my hand this 3d day of September, 1892.

JOHN C. HENRY.

Witnesses:
JOHN M. C. MARSH,
S. E. WILCOX.